United States Patent
Ohno et al.

(10) Patent No.: US 10,131,311 B2
(45) Date of Patent: Nov. 20, 2018

(54) DRIVING SEAT AIRBAG DEVICE

(71) Applicant: TOYOTA JIDOSHA KABUSHIKI KAISHA, Toyota-shi (JP)

(72) Inventors: Mitsuyoshi Ohno, Miyoshi (JP); Osamu Fukawatase, Miyoshi (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 21 days.

(21) Appl. No.: 15/211,126

(22) Filed: Jul. 15, 2016

(65) Prior Publication Data
US 2017/0028956 A1 Feb. 2, 2017

(30) Foreign Application Priority Data
Jul. 28, 2015 (JP) .................... 2015-148571

(51) Int. Cl.
| | | |
|---|---|---|
| *B60R 21/231* | (2011.01) | |
| *B60R 21/203* | (2006.01) | |
| *B60R 21/201* | (2011.01) | |
| *B60R 21/00* | (2006.01) | |

(52) U.S. Cl.
CPC .......... *B60R 21/231* (2013.01); *B60R 21/203* (2013.01); *B60R 21/201* (2013.01); *B60R 2021/0009* (2013.01); *B60R 2021/0048* (2013.01)

(58) Field of Classification Search
CPC . B60R 21/203; B60R 21/201; B60R 21/2165; B60R 21/231; B60R 2021/0048; B60R 2021/0009; B60R 2021/23324; B60R 2021/23332; B60R 2021/21525; B60R 2021/2395
See application file for complete search history.

(56) References Cited

U.S. PATENT DOCUMENTS

| | | | | |
|---|---|---|---|---|
| 3,476,402 A | * | 11/1969 | Wilfert | ................. B60R 21/233 280/729 |
| 3,752,501 A | * | 8/1973 | Daniel | ................. B60R 21/233 280/729 |
| 3,795,414 A | * | 3/1974 | Ventre | ................. B60R 21/2032 206/522 |
| 4,772,045 A | * | 9/1988 | Kawaguchi | ............. B60R 21/23 280/728.1 |
| 5,240,283 A | * | 8/1993 | Kishi | ................... B60R 21/233 280/729 |
| 5,253,892 A | | 10/1993 | Satoh | |

(Continued)

FOREIGN PATENT DOCUMENTS

| | | |
|---|---|---|
| JP | 62-43056 U | 3/1987 |
| JP | 5-155300 | 6/1993 |

(Continued)

*Primary Examiner* — Paul N Dickson
*Assistant Examiner* — Timothy Wilhelm
(74) *Attorney, Agent, or Firm* — Oblon, McClelland, Maier & Neustadt, L.L.P.

(57) ABSTRACT

A driving seat airbag device includes: a driving seat airbag that is inflated and deployed at a vehicle rear side of a steering wheel on being supplied with gas; and a sliding cloth that is deployed in conjunction with inflation and deployment of the driving seat airbag, that covers an airbag rear face at a vehicle rear side of the driving seat airbag, and that is capable of movement in a vehicle width direction with respect to the airbag rear face.

14 Claims, 10 Drawing Sheets

(56) References Cited

U.S. PATENT DOCUMENTS

| | | | | |
|---|---|---|---|---|
| 5,529,337 | A | 6/1996 | Takeda et al. | |
| 5,560,649 | A * | 10/1996 | Saderholm | B60R 21/233 280/739 |
| 5,727,811 | A * | 3/1998 | Nagata | B60Q 5/003 280/731 |
| 5,732,973 | A * | 3/1998 | Turnbull | B60R 21/2342 280/730.1 |
| 5,927,748 | A * | 7/1999 | O'Driscoll | B60R 21/233 280/729 |
| 5,931,497 | A * | 8/1999 | Fischer | B60R 21/2338 280/735 |
| 6,042,147 | A * | 3/2000 | Nishijima | B60R 21/217 280/731 |
| 6,099,026 | A * | 8/2000 | Ando | B60R 21/201 280/728.1 |
| 6,206,409 | B1 * | 3/2001 | Kato | B60R 21/201 280/728.2 |
| 6,213,496 | B1 * | 4/2001 | Minami | B60R 21/231 280/729 |
| 6,419,267 | B1 * | 7/2002 | Hashimoto | B60R 21/233 280/729 |
| 6,554,313 | B2 * | 4/2003 | Uchida | B60R 21/233 280/729 |
| 6,962,363 | B2 * | 11/2005 | Wang | B60R 21/233 280/729 |
| 7,111,866 | B2 * | 9/2006 | Abe | B60R 21/233 280/729 |
| 7,210,701 | B2 * | 5/2007 | Meissner | B60R 21/231 280/729 |
| 7,213,834 | B2 * | 5/2007 | Mizuno | B60R 21/203 280/730.1 |
| 7,445,239 | B2 * | 11/2008 | Okada | B60R 21/237 280/743.1 |
| 7,597,343 | B2 * | 10/2009 | Miwa | B60R 21/20 280/728.2 |
| 7,695,013 | B2 * | 4/2010 | Kakstis | B60R 21/20 280/743.1 |
| 7,845,683 | B2 * | 12/2010 | Sato | B60R 21/201 280/743.2 |
| 7,850,198 | B2 * | 12/2010 | Hayakawa | B60R 21/206 280/730.1 |
| 7,891,700 | B2 * | 2/2011 | Ishida | B60R 21/2032 280/730.1 |
| 7,914,038 | B2 * | 3/2011 | Koyama | B60R 21/205 280/730.1 |
| 8,414,019 | B2 * | 4/2013 | Naganawa | B60R 21/203 280/730.1 |
| 8,439,395 | B2 * | 5/2013 | Nagai | B60R 21/2346 280/729 |
| 8,596,679 | B2 * | 12/2013 | Horikawa | B60R 21/201 280/732 |
| 8,714,588 | B2 * | 5/2014 | Honda | B60R 21/20 280/729 |
| 8,764,053 | B1 * | 7/2014 | Dix | B60R 21/203 280/729 |
| 8,789,848 | B2 * | 7/2014 | Takagi | B60R 21/237 280/728.2 |
| 8,876,153 | B2 * | 11/2014 | Dix | B60R 21/233 280/729 |
| 9,016,721 | B1 * | 4/2015 | Potter | B60R 21/239 280/739 |
| 9,321,421 | B2 * | 4/2016 | Fukawatase | B60R 21/231 |
| 9,663,060 | B1 * | 5/2017 | Deng | B60R 21/233 |
| 9,676,355 | B2 * | 6/2017 | Kruse | B60R 21/0136 |
| 9,688,234 | B2 * | 6/2017 | Yamanaka | B60R 21/23138 |
| 2006/0163848 | A1 * | 7/2006 | Abe | B60R 21/231 280/729 |
| 2012/0025497 | A1 * | 2/2012 | Yoo | B60R 21/233 280/729 |
| 2014/0375032 | A1 | 12/2014 | Fukawatase et al. | |
| 2014/0375035 | A1 | 12/2014 | Fukawatase et al. | |
| 2016/0288756 | A1 * | 10/2016 | Ishiguro | B60R 21/203 |

FOREIGN PATENT DOCUMENTS

| | | |
|---|---|---|
| JP | 7-156740 | 6/1995 |
| JP | 2008-94224 | 4/2008 |
| JP | 2015-3675 | 1/2015 |
| JP | 2015-6840 | 1/2015 |
| JP | 2015-116912 | 6/2015 |

* cited by examiner

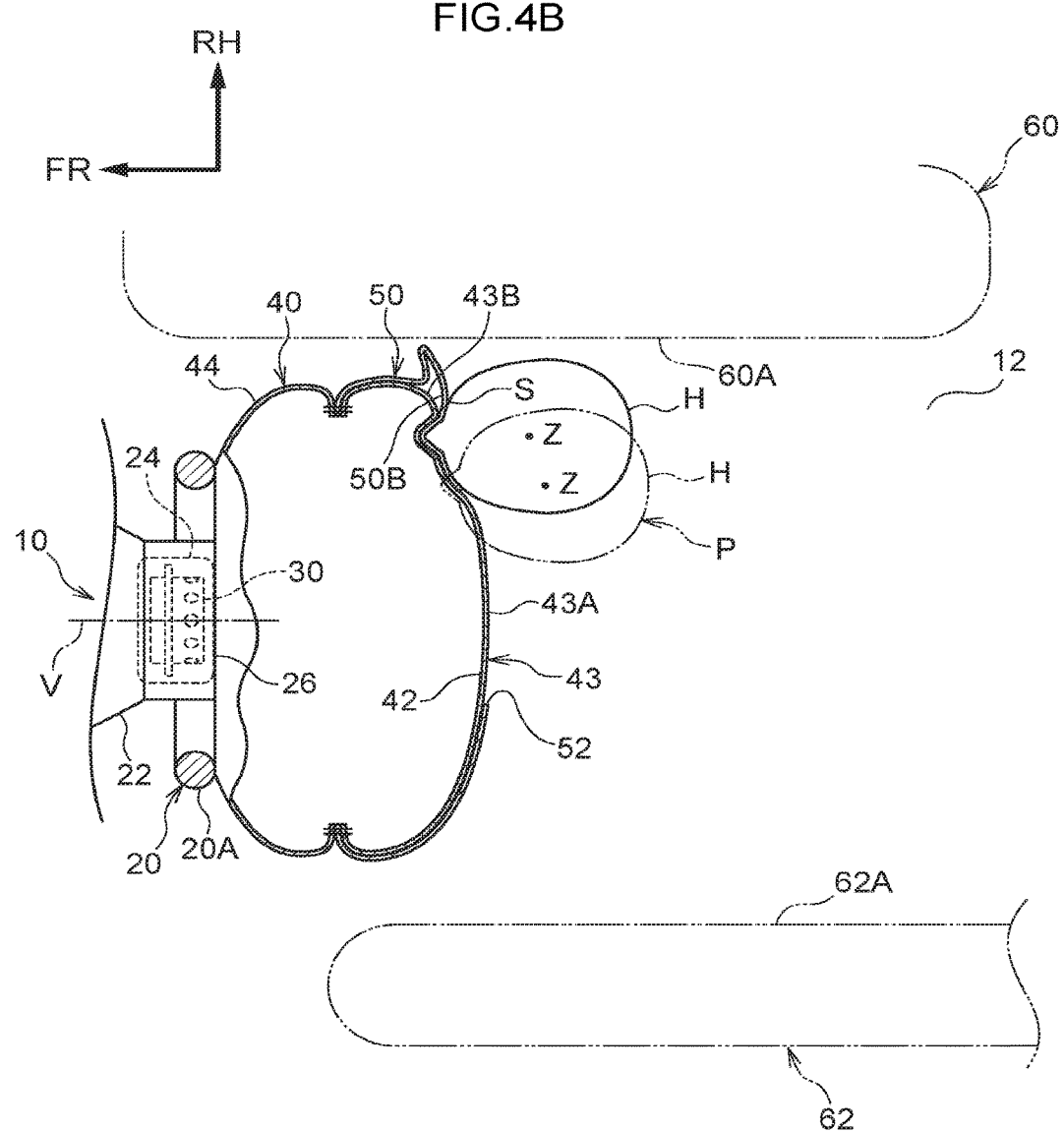

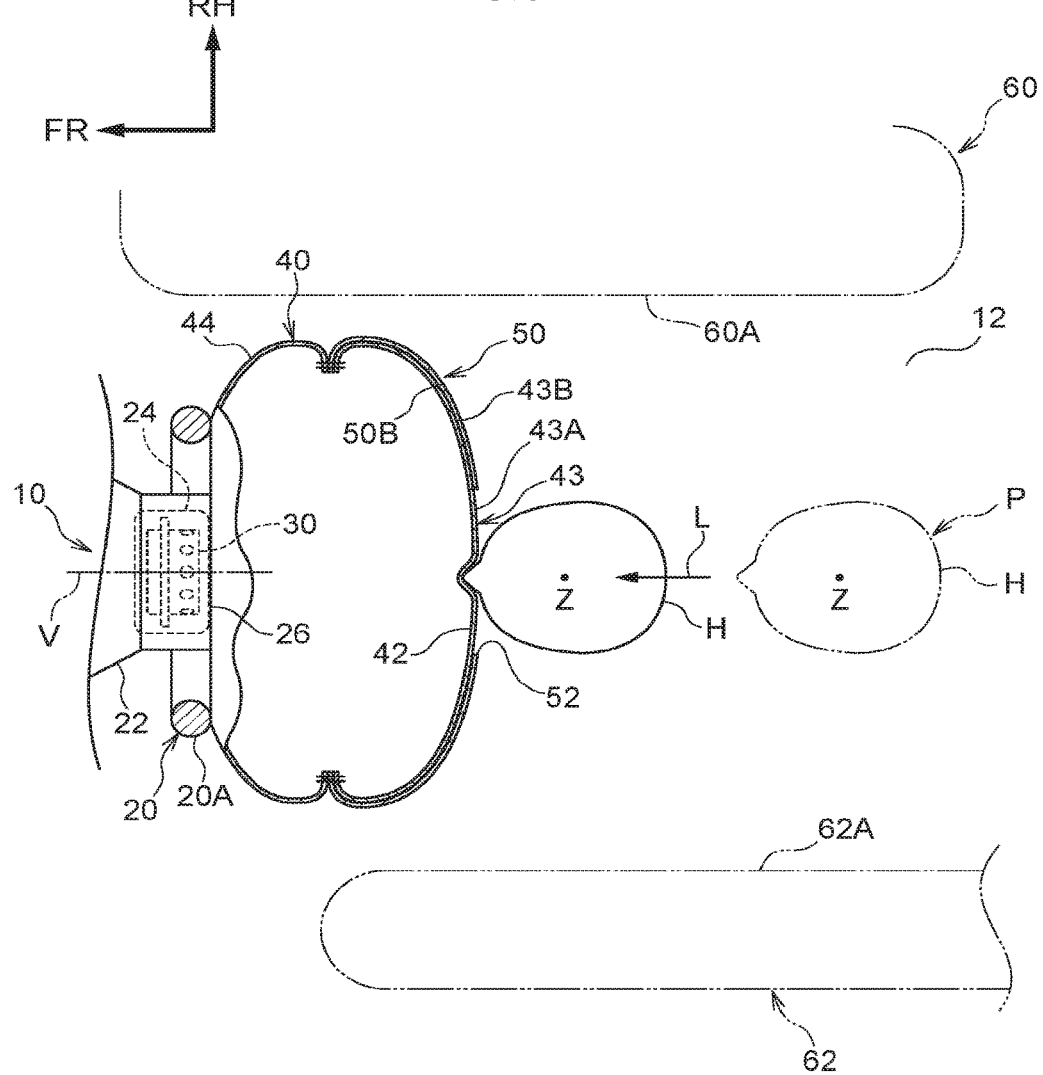

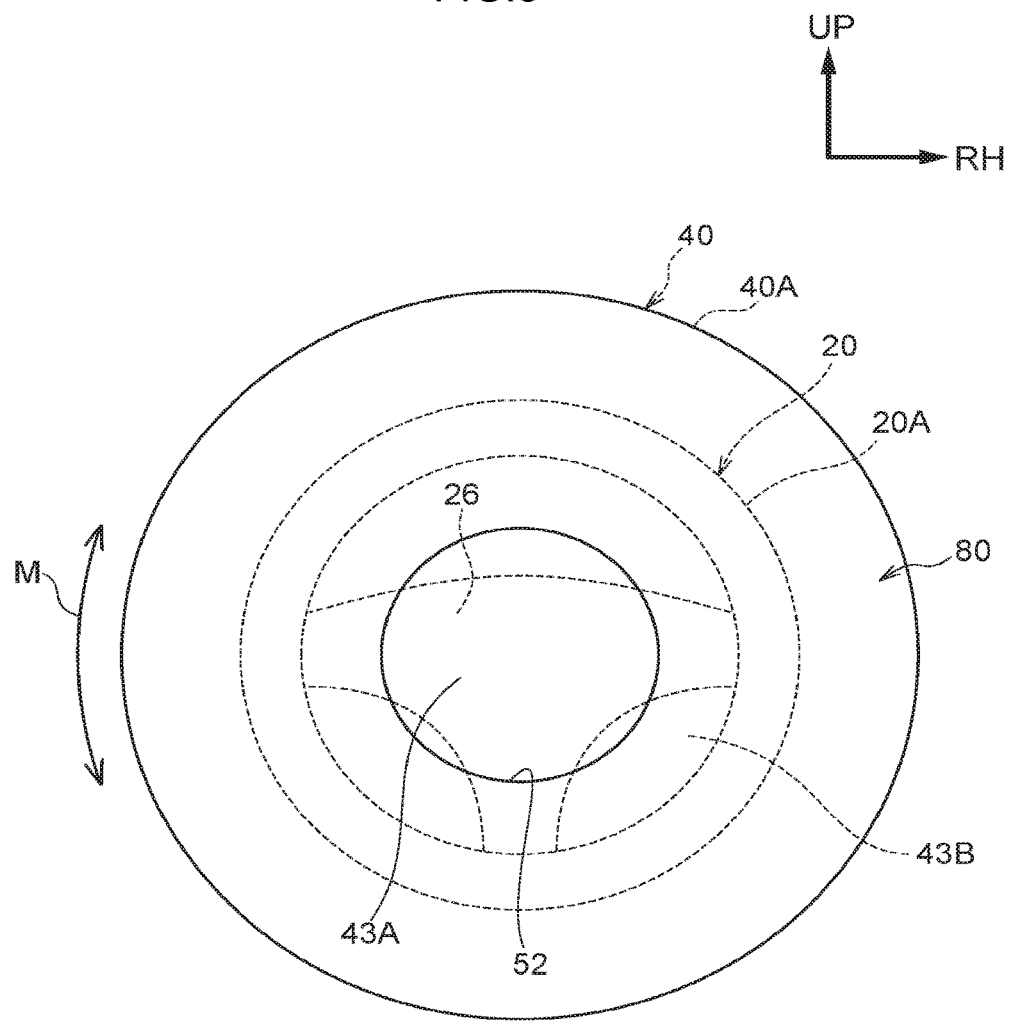

DRIVING SEAT AIRBAG DEVICE

CROSS-REFERENCE TO RELATED APPLICATION

This application is based on and claims priority under 35 USC 119 from Japanese Patent Application No. 2015-148571 filed on Jul. 28, 2015, the disclosure of which is incorporated by reference herein.

BACKGROUND

Technical Field

The present disclosure relates to a driving seat airbag device.

Related Art

As of driving seat airbag devices, there are driving seat airbag devices in which a linking portion, between a tether that regulates the thickness of an inflated and deployed airbag and an opposite-to-occupant-side base cloth of the airbag, is disposed on a rim of a steering wheel (see, for example, Japanese Patent Application Laid-Open (JP-A) No. 2008-094224).

Note that, besides Patent Document 1, for example, JP-A Nos. H07-156740, H05-155300, 2015-003675, and 2015-006840 also describe technology relating to airbag devices.

However, the following concern arises when the head of an occupant (hereafter sometimes referred to as "occupant head") seated in the driving seat moves obliquely toward the vehicle front at the time of an oblique collision in which a colliding body collides obliquely with a vehicle front face, or a small overlap collision in which a colliding body collides with the vehicle front face further toward the vehicle width direction outer side than a front side member. Namely, the occupant head contacts the inflated and deployed driving seat airbag obliquely toward the vehicle front. There is accordingly a possibility that the occupant head rotates about an axis along the up-down direction of the occupant head

SUMMARY

In consideration of the above circumstances, an object of the present disclosure is to obtain a driving seat airbag device capable of suppressing rotation of the head of a driving seat occupant in cases in which the head has contacted an inflated and deployed driving seat airbag obliquely toward the vehicle front.

Solution to Problem

A driving seat airbag device according to a first aspect includes: a driving seat airbag that is inflated and deployed at a vehicle rear side of a steering wheel on being supplied with gas; and a sliding cloth that is deployed in conjunction with inflation and deployment of the driving seat airbag, that covers an airbag rear face at a vehicle rear side of the driving seat airbag, and that is capable of movement in a vehicle width direction with respect to the airbag rear face.

In the above driving seat airbag device, when gas is supplied to the driving seat airbag at the time of an oblique collision or a small overlap collision, for example, the driving seat airbag is inflated and deployed at the vehicle rear side of the steering wheel. The sliding cloth is also deployed in conjunction with inflation and deployment of the driving seat airbag. The sliding cloth covers the airbag rear face at the vehicle rear side of the driving seat airbag, and is capable of movement in the vehicle width direction with respect to the airbag rear face.

Thus, when the head of a driving seat occupant contacts the sliding cloth obliquely toward the vehicle front at the time of an oblique collision or the like, the sliding cloth moves in the vehicle width direction with respect to the airbag rear face. The occupant head thereby slides (slides and moves) together with the sliding cloth in the vehicle width direction over the airbag rear face. The occupant head is thereby suppressed from rotating about an axis along the up-down direction of the occupant head.

A driving seat airbag device according to a second aspect is the driving seat airbag device according to the first aspect, wherein an opening that exposes a central region of the airbag rear face is formed in the sliding cloth.

In the above driving seat airbag device, the opening that exposes the central region of the airbag rear face is formed in the sliding cloth. Thus, when the occupant head moves toward the vehicle front at the time of a full overlap collision (head-on collision), for example, the occupant head contacts the airbag rear face that is exposed through the opening of the sliding cloth. Namely, in cases in which the occupant head has moved toward the vehicle front at the time of a full overlap collision, the occupant head can be restrained by the airbag rear face without being influenced by the sliding cloth.

However, in cases in which the occupant head has moved obliquely toward the vehicle front at the time of an oblique collision or the like, the occupant head contacts the sliding cloth at an outer periphery of the opening while moving obliquely toward the vehicle front. Thus, as previously described, the occupant head accordingly moves together with the sliding cloth in the vehicle width direction with respect to the airbag rear face. The occupant head is thereby suppressed from rotating about the axis along the up-down direction of the occupant head.

In this manner, the present aspect enables rotation of the occupant head at the time of an oblique collision or the like to be suppressed, while eliminating, or alleviating, the influence of the sliding cloth with respect to restraint performance of the occupant head by the driving seat airbag during a full overlap collision.

A driving seat airbag device according to a third aspect is the driving seat airbag device according to the second aspect, wherein: an outer peripheral section of the driving seat airbag is inflated and deployed further toward an outer side than a rim of the steering wheel as viewed from an axial direction of the steering wheel; an outer peripheral section of the sliding cloth is joined to the outer peripheral section of the driving seat airbag; and the opening is disposed at an inner side of the rim as viewed from the axial direction of the steering wheel.

In the above driving seat airbag device, the outer peripheral section of the driving seat airbag is inflated and deployed further toward the outer side than the rim of the steering wheel as viewed from the axial direction of the steering wheel. The outer peripheral section of the sliding cloth is joined to the outer peripheral section of the driving seat airbag. The opening of the sliding cloth is disposed at the inner side of the rim of the steering wheel as viewed from the axial direction of the steering wheel. Namely, the sliding cloth covers the airbag rear face from the inner side across to the outer side of the rim as viewed from the axial direction of the steering wheel.

Note that the occupant head is liable to contact a region of the driving seat airbag that is peripheral to the rim as viewed from the axial direction of the steering wheel when the occupant head moves obliquely toward the vehicle front at the time of an oblique collision or the like.

However, as described above, the sliding cloth of the present aspect covers the airbag rear face from the inner side across to the outer side of the rim as viewed from the axial direction of the steering wheel. The occupant head thereby contacts the sliding cloth more readily in cases in which the occupant head has moved obliquely toward the vehicle front at the time of an oblique collision or the like. This enables rotation of the occupant head at the time of an oblique collision or the like to be even more efficiently suppressed.

A driving seat airbag device according to a fourth aspect is the driving seat airbag device according to any one of the first aspect to the third aspect, wherein plural slits are formed in the sliding cloth.

In the above driving seat airbag device, the plural slits are formed in the sliding cloth. The region of the sliding cloth where the plural slits are formed thereby moves more readily in the vehicle width direction with respect to the airbag rear face. This enables rotation of the occupant head at the time of an oblique collision or the like to be suppressed.

A driving seat airbag device according to a fifth aspect is the driving seat airbag device according to the fourth aspect, wherein each of the plurality of slits extends from a center side toward an outer peripheral side of the steering wheel and are disposed along a circumferential direction of the steering wheel.

In the above driving seat airbag device, each of the plural slits extends from the center side toward the outer peripheral side of the steering wheel and are disposed along a circumferential direction of the steering wheel. Forming the plural slits in the sliding cloth in this manner enables the slits to be disposed extending from the center side toward the outer peripheral side of the steering wheel at both vehicle width direction sides of the driving seat airbag, regardless of a rotation angle of the steering wheel during inflation and deployment of the driving seat airbag. This enables rotation of the occupant head at the time of an oblique collision or the like to be effectively suppressed.

A driving seat airbag device according to a sixth aspect is the driving seat airbag device according to any one of the first aspect to the fifth aspect, wherein an elongation ratio of the sliding cloth is higher than an elongation ratio of an occupant-side base cloth that forms the airbag rear face.

In the above driving seat airbag device, the elongation ratio of the sliding cloth is higher than the elongation ratio of the occupant-side base cloth that forms the airbag rear face. The sliding cloth thereby moves more readily in the vehicle width direction with respect to the airbag rear face. This enables rotation of the occupant head at the time of an oblique collision or the like to be suppressed.

A driving seat airbag device according to a seventh aspect is the driving seat airbag device according to any one of the fourth aspect to the sixth aspect, wherein a coefficient of friction of a contact face of the sliding cloth that contacts the airbag rear face is lower than a coefficient of friction of the airbag rear face.

In the above driving seat airbag device, the coefficient of friction of the contact face of the sliding cloth that contacts the airbag rear face is lower than the coefficient of friction of the airbag rear face. Thus, the sliding cloth moves more readily (slides more readily) in the vehicle width direction with respect to the airbag rear face. This enables rotation of the occupant head at the time of an oblique collision or the like to be even more efficiently suppressed.

As explained above, the driving seat airbag device of the present disclosure is capable of suppressing rotation of the head of the driving seat occupant in cases in which the head has contacted the inflated and deployed driving seat airbag obliquely toward the vehicle front.

BRIEF DESCRIPTION OF THE DRAWINGS

Exemplary embodiments of the present disclosure will be described in detail based on the following figures, wherein:

FIG. 4B is a plan view cross-section illustrating a state in which the sliding cloth illustrated in FIG. 4A has moved toward one vehicle width direction side with respect to an airbag rear face;

FIG. 5 is a plan view cross-section illustrating a state in which the head of an occupant has contacted a central region of an airbag rear face of the driving seat airbag illustrated in FIG. 1;

FIG. 8 is a face-on view corresponding to FIG. 2, illustrating a deployed state of a sliding cloth of a third exemplary embodiment.

DETAILED DESCRIPTION

Explanation follows regarding a driving seat airbag device 10 according to exemplary embodiments, with reference to the drawings. Note that in each of the drawings as appropriate, the arrow FR indicates toward the vehicle front (vehicle front-rear direction front side), and the arrow UP indicates toward the vehicle upper side (vehicle up-down direction upper side). The arrow RH indicates toward one vehicle width direction side (the right side when facing the vehicle front). In the below explanation, unless specifically stated otherwise, reference to the front and rear, up and down, and left and right refers to front and rear in the vehicle front-rear direction, up and down in the vehicle up-down direction, and left and right in the vehicle width direction.

First Exemplary Embodiment

First, explanation follows regarding a first exemplary embodiment.

Figure 1:
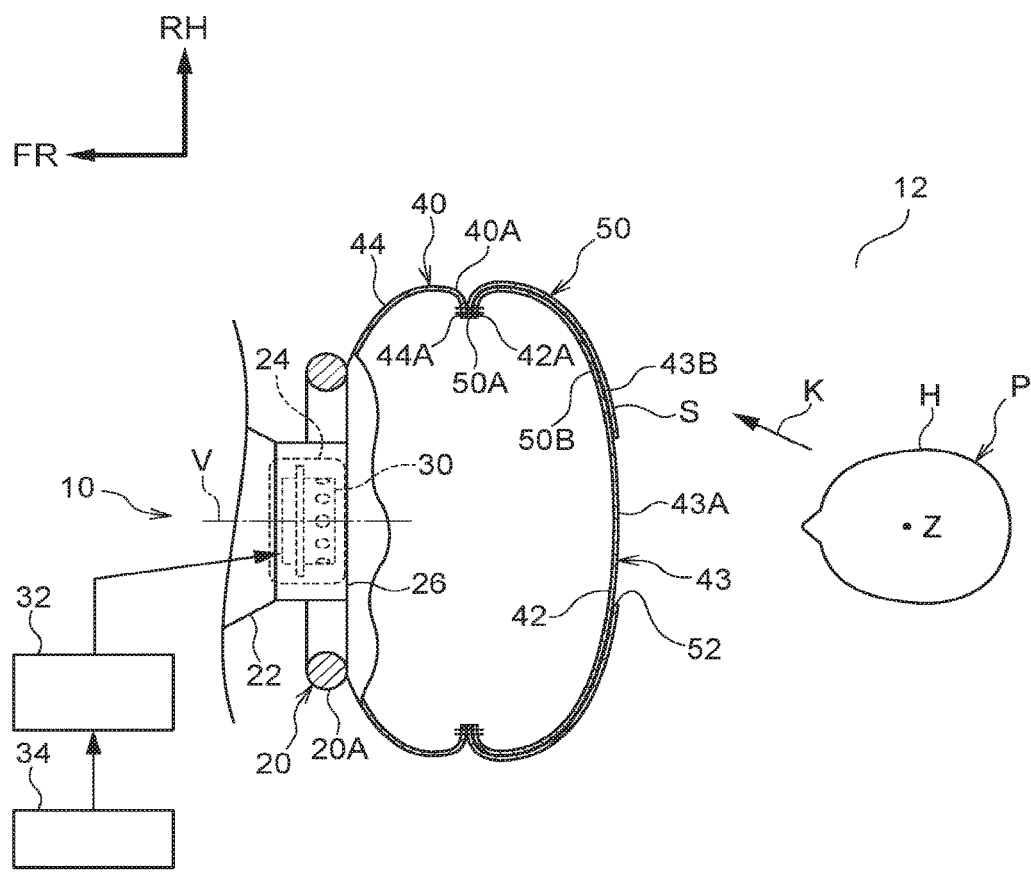
FIG. 1 is a plan view cross-section illustrating an inflated and deployed state of a driving seat airbag and a sliding cloth of a driving seat airbag device according to a first exemplary embodiment.

FIG. 1 illustrates a steering wheel 20 of a vehicle applied with the driving seat airbag device 10 according to the first exemplary embodiment. Note that in the present exemplary embodiment, the steering wheel 20 and a driving seat (front seat), not illustrated in the drawings, are provided at the left side of the vehicle width direction center of a cabin 12 of the vehicle. A front passenger seat, not illustrated in the drawings, is provided at the right side of the vehicle width direction center of the vehicle.

The steering wheel 20 is rotatably supported by a steering column 22 that projects out toward the vehicle rear (driving seat side) from an instrument panel, not illustrated in the drawings, forming a front wall section of the cabin 12. A rotation axis V of the steering wheel 20 extends along the vehicle front-rear direction, for example, and is sloped with respect to the vehicle front-rear direction so as to be oriented toward the vehicle upper side on progression toward the vehicle rear.

The driving seat airbag device 10 includes an inflator 30 and a driving seat airbag 40. The inflator 30, serving as a gas supply device, includes a gas ejection section that ejects gas into the driving seat airbag 40. The inflator 30 is stowed together with the driving seat airbag 40 inner side an airbag case 24 provided inner side the steering column 22.

An airbag ECU 32, serving as a controller, is electrically connected to the inflator 30. Actuation of the inflator 30 (ejection of gas) is controlled by the airbag ECU 32. Specifically, a collision sensor 34 is electrically connected to the airbag ECU 32. The collision sensor 34 is capable of detecting or predicting various types of front-end collisions, such as a full overlap collision, an offset collision, an oblique collision, or a small overlap collision, and outputs the detected or predicted collision data to the airbag ECU 32 as a signal. The airbag ECU 32 actuates the inflator 30 based on the signal input from the collision sensor 34, causing gas to be ejected from the gas ejection section of the inflator 30.

On being supplied with gas from the inflator 30, the driving seat airbag 40 is inflated and deployed at the vehicle rear side of the steering wheel 20. More specifically, the driving seat airbag 40 is inflated and deployed between the steering wheel 20, and the occupant head H of a driving seat occupant P seated in the driving seat, not illustrated in the drawings. Note that FIG. 1 illustrates the driving seat airbag 40 in an inflated and deployed state.

In the inflated and deployed state, the driving seat airbag 40 includes an occupant-side base cloth 42 facing the driving seat occupant P side, and an opposite-to-occupant-side base cloth 44 facing the opposite side to the driving seat occupant P, namely, the steering wheel 20 side. The driving seat airbag 40 is formed in a bag shape by stitching together respective outer faces of outer peripheral portions of the occupant-side base cloth 42 and the opposite-to-occupant-side base cloth 44 in a mutually superimposed state. A non-illustrated tether, for example, which restricts the thickness of the inflated and deployed driving seat airbag 40, is provided inner side the driving seat airbag 40. The tether is stitched to both the occupant-side base cloth 42 and the opposite-to-occupant-side base cloth 44 as appropriate.

The driving seat airbag 40 is stowed inner side the airbag case 24 in a folded state, and in a state with the above-described gas ejection section of the inflator 30 disposed inner side. An opening (deployment opening) that is closed off by a steering wheel pad 26 is formed in a rear end side of the airbag case 24. The steering wheel pad 26 is split open in conjunction with inflation and deployment of the driving seat airbag 40. The driving seat airbag 40 that was stowed inner side the airbag case 24 is thereby inflated and deployed from the steering wheel 20 toward the vehicle rear.

Figure 2:
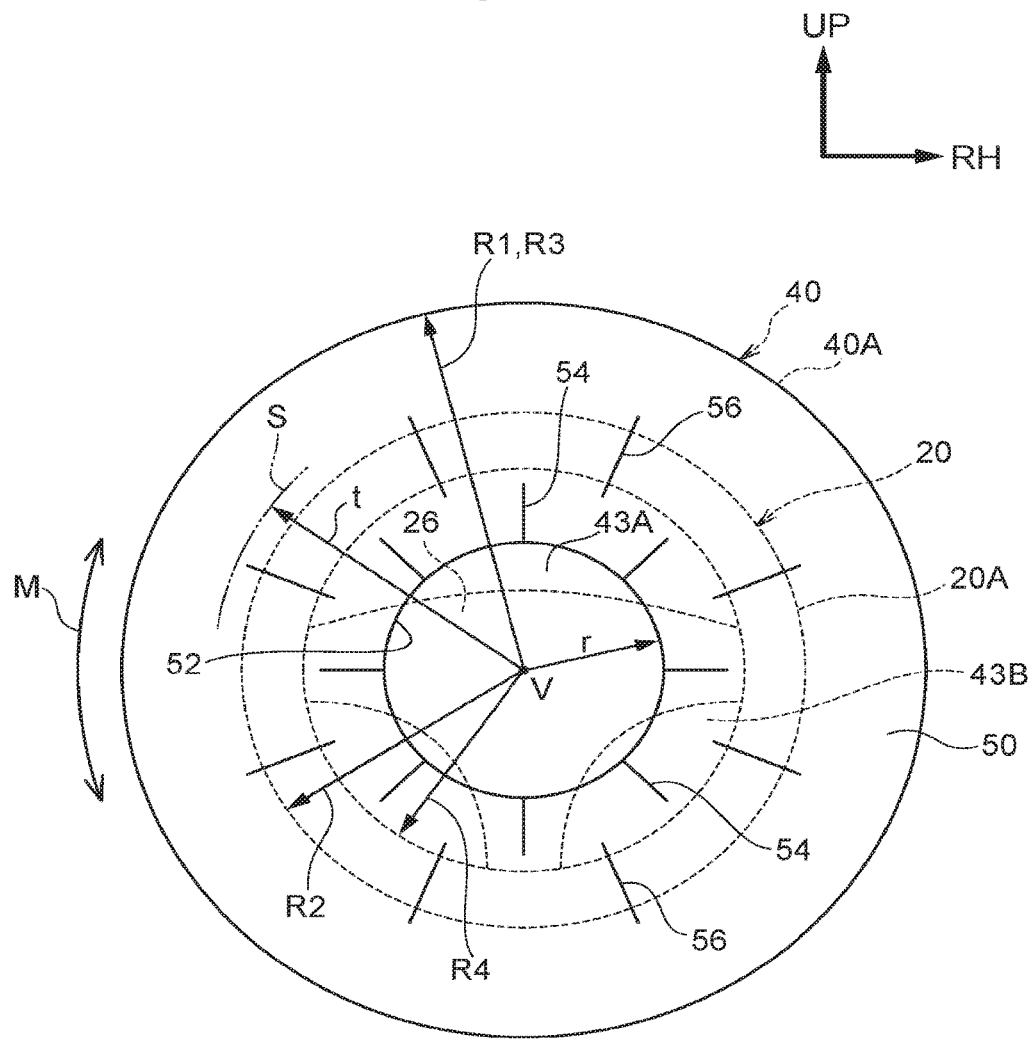
FIG. 2 is enlarged face-on view of the driving seat airbag and the sliding cloth illustrated in FIG. 1, as viewed from an axial direction of a steering wheel.

As illustrated in FIG. 2, the driving seat airbag 40 is inflated and deployed in a circular shape as viewed from the axial direction of the rotation axis V of the steering wheel 20 (hereafter sometimes simply referred to as "axial direction"). A radius R1 of the driving seat airbag 40 is larger than a radius R2 of an outer diameter of a rim 20A of the steering wheel 20 (R1>R2). An outer peripheral section 40A of the driving seat airbag 40 is thereby inflated and deployed further toward the outer side (the radial direction outer side of the rim 20A) than the rim 20A along its entire circumference, as viewed from the axial direction of the steering wheel 20.

Note that a sliding cloth (separate cloth) 50 is provided to the driving seat airbag 40. The sliding cloth 50 is deployed at the vehicle rear side of the driving seat airbag 40 in conjunction with inflation and deployment of the driving seat airbag 40. In a deployed state, a radius R3 of an outer diameter of the sliding cloth 50 is formed in a circular ring shape that is larger than the radius R2 of the outer diameter of the rim 20A (R3>R2). Note that the radius R3 of the outer diameter of the sliding cloth 50 is substantially the same as the radius R1 of the driving seat airbag 40 (R1≈R3). The sliding cloth 50 is formed of a similar cloth to that of the occupant-side base cloth 42 (base cloth), for example.

As illustrated in FIG. 1, an outer peripheral section 50A of the sliding cloth 50 is joined to the outer peripheral section 40A of the driving seat airbag 40. More specifically, the outer peripheral section 50A of the sliding cloth 50 is disposed between an outer peripheral section 42A of the occupant-side base cloth 42 and an outer peripheral section 44A of the opposite-to-occupant-side base cloth 44 along its entire circumference. The outer peripheral section 50A of the sliding cloth 50 is stitched to the respective outer peripheral sections 42A, 44A of the occupant-side base cloth 42 and the opposite-to-occupant-side base cloth 44. Note that the outer peripheral section 50A of the sliding cloth 50 may be joined (adhered) to the outer peripheral section 40A of the driving seat airbag 40 by adhesive or the like, for example, rather than being stitched thereto.

The sliding cloth 50 is stowed together with the driving seat airbag 40 in a folded state inner side the airbag case 24. The sliding cloth 50 is deployed along an airbag rear face 43 at the vehicle rear side of the driving seat airbag 40 in conjunction with inflation and deployment of the driving seat airbag 40. The airbag rear face 43 of the driving seat airbag 40 is thereby covered by the sliding cloth 50.

As illustrated in FIG. 2, an opening 52 that exposes a central region 43A of the airbag rear face 43 of the driving seat airbag 40 is formed in a central section of the sliding cloth 50. A radius r of the opening 52 is formed in a circular shape that is smaller than a radius R4 of an inner diameter of the rim 20A (r<R4). In the deployed state of the sliding cloth 50, the opening 52 is disposed inner side the rim 20A as viewed from the axial direction of the steering wheel 20. An outer side region 43B at an outer periphery of the central region 43A of the airbag rear face 43 is covered by the sliding cloth 50 formed in a circular ring shape in this manner.

The central region 43A of the airbag rear face 43 is, for example, a region (full overlap collision region) contacted by the occupant head H that has moved toward the vehicle front at the time of a full overlap collision (head-on collision). Note that in the present exemplary embodiment, the central region 43A of the airbag rear face 43 is a region contacted by the head of a dummy simulating the driving seat occupant. Thus, the dummy is referred to as driving seat occupant P, and the head of the dummy is referred to as occupant head H in the below explanation. The central region 43A and the opening 52 configure a circular shaped region disposed at the center of the steering wheel 20, for example, as viewed from the axial direction of the steering wheel 20. The central region 43A and the opening 52 are set larger than the occupant head H, but smaller than an inner circumference of the rim 20A.

A World Side Impact Dummy (World SID) of a $50^{th}$ percentile American adult male (AM50), for example, is employed as the dummy. The dummy is seated in the driving seat (vehicle seat) in a standard seated posture specified in crash testing methods. A front-rear position of a seat cushion of the driving seat with respect to the cabin 12 and a slope angle of a seatback with respect to the seat cushion are adjusted to reference setting positions corresponding to the seated posture.

However, the sliding cloth 50 is in close contact with the outer side region 43B of the airbag rear face 43 due to the inflation pressure of the driving seat airbag 40. The sliding cloth 50 therefore moves less readily in the vehicle width direction with respect to the outer side region 43B of the airbag rear face 43.

However, the sliding cloth 50 of the present exemplary embodiment is formed with plural inner side slits 54 and plural outer side slits 56, serving as plural slits. The plural inner side slits 54 extend from the central side toward the outer peripheral side of the steering wheel 20, and are disposed along a circumferential direction of the steering wheel 20 (the arrow M). More specifically, the plural inner side slits 54 extends out from a peripheral edge of the opening 52 toward the radial direction outer side of the steering wheel 20, and are disposed spaced at intervals along a circumferential direction of the steering wheel 20. Namely, the plural inner side slits 54 extend out in a radiating shape from the peripheral edge of the opening 52 toward the radial direction outer side of the steering wheel 20, centered on the central region 43A of the airbag rear face 43.

The plural outer side slits 56 are disposed further toward the outer peripheral side of the sliding cloth 50 (steering wheel 20) than the plural inner side slits 54. Similarly to the plural inner side slits 54, the plural outer side slits 56 extend from the central side toward the outer peripheral side of the steering wheel 20, and are disposed along a circumferential direction of the steering wheel 20. More specifically, the plural outer side slits 56 extend along the radial direction of the steering wheel 20, and are disposed spaced at intervals along a circumferential direction of the steering wheel 20. The plural outer side slits 56 intersect the rim 20A as viewed from the axial direction of the steering wheel 20.

The plural outer side slits 56 are disposed offset from the plural inner side slits 54 in a circumferential direction. In other words, as viewed from the axial direction of the steering wheel 20, the outer side slits 56 extend out toward the radial direction outer side of the steering wheel 20 from between inner side slits 54 that are adjacent in a circumferential direction of the steering wheel 20.

In a region of the sliding cloth 50 where the plural inner side slits 54 and plural outer side slits 56 are formed in this manner (hereafter referred to as "slit formation region S"), tension acting on the sliding cloth 50 in conjunction with inflation and deployment of the driving seat airbag 40 is alleviated, such that the slit formation region S comes away from the outer side region 43B of the airbag rear face 43 more readily. The slit formation region S is thereby capable of movement in the vehicle width direction with respect to the outer side region 43B of the airbag rear face 43. Note that the slit formation region S of the present exemplary embodiment is a circular ring shaped region with an outer diameter of radius t(t>R2), and an inner diameter of radius r.

Explanation follows regarding operation of the first exemplary embodiment.

Basic Operation and Oblique Collision

First, explanation follows regarding basic operation of the driving seat airbag device 10. Explanation then follows regarding operation of the driving seat airbag device 10 during an oblique collision at a vehicle front face, with comparison to a comparative example.

As illustrated in FIG. 1, when the airbag ECU 32 detects an oblique collision or the like based on the signal from the collision sensor 34, the airbag ECU 32 actuates the inflator 30 of the driving seat airbag device 10, causing gas to be jetted from the gas ejection section of the inflator 30 into the driving seat airbag 40. On being supplied with gas from the inflator 30, the driving seat airbag 40 is thereby inflated and deployed at the vehicle rear side of the steering wheel 20. The steering wheel pad 26 is split open by the inflation pressure of the driving seat airbag 40 when this occurs. The sliding cloth 50 is also deployed along the airbag rear face 43 of the driving seat airbag 40 in conjunction with inflation and deployment of the driving seat airbag 40.

Comparative Example

Figure 3:
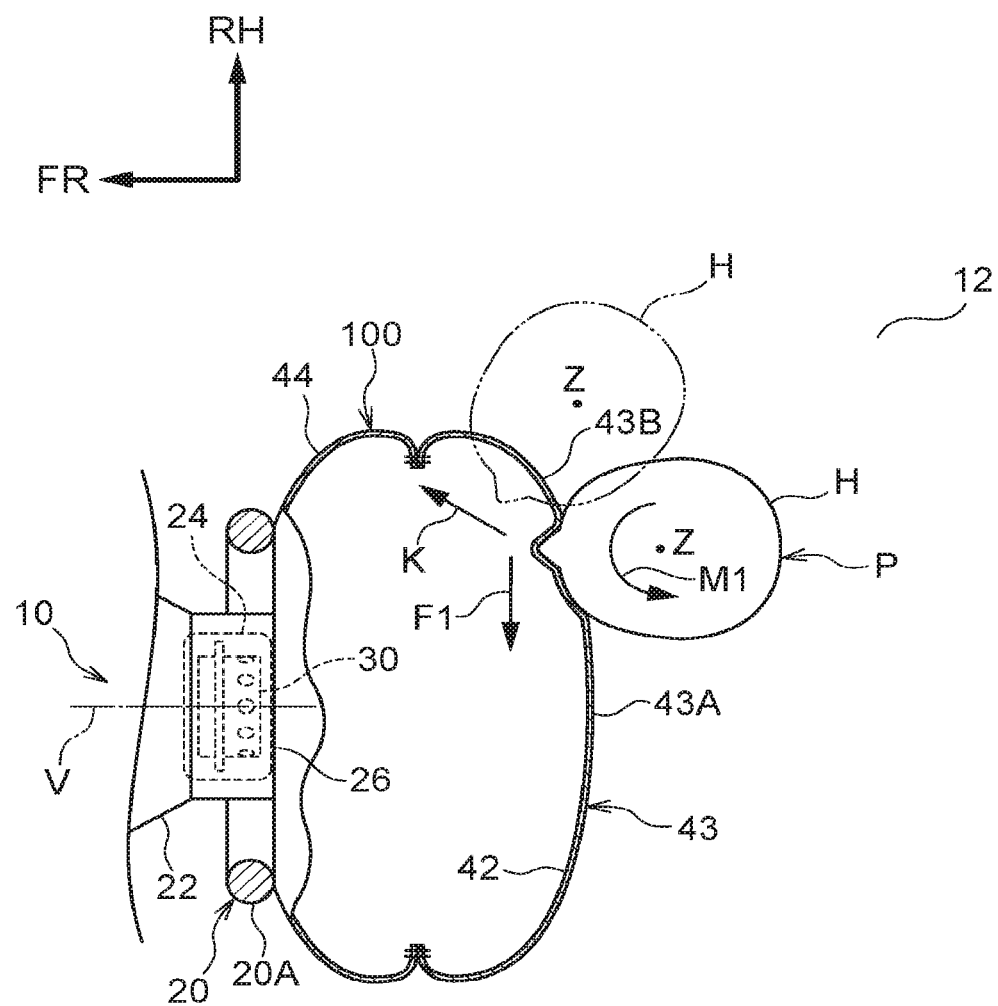
FIG. 3 is plan view cross-section illustrating an inflated and deployed state of a driving seat airbag of a comparative example.

Note that, during an oblique collision at the front passenger seat side, the occupant head H of the driving seat occupant P moves obliquely toward the vehicle front of the vehicle (the arrow K direction, this being toward the vehicle front and toward the vehicle width direction center side). In such cases, as illustrated in FIG. 3, for example, in a driving seat airbag 100 according to a comparative example that does not include the sliding cloth 50, as illustrated by the solid line, the occupant head H contacts the outer side region 43B of the airbag rear face 43 obliquely toward the vehicle front. In such cases, there is a possibility that the occupant head H rotates about an axis (hereafter referred to as "up-down axis") Z along the up-down direction of the occupant head H.

More specifically, when the occupant head H contacts the outer side region 43B of the airbag rear face 43 obliquely toward the vehicle front (the arrow K direction) in the comparative example, a friction force F1 toward the central region 43A of the airbag rear face 43 occurs at a contact portion of the occupant head H with the airbag rear face 43. A moment M1, which rotates the occupant head H about the up-down axis Z so as to turn the occupant head toward the airbag rear face 43 side, occurs due to the friction force F1. There is accordingly a possibility that the occupant head H rotates about the up-down axis Z, as illustrated by the double-dotted dashed line.

In contrast thereto, in the driving seat airbag device 10 according to the present exemplary embodiment, the sliding cloth 50 is provided to the driving seat airbag 40 as previously described. The sliding cloth 50 includes the slit formation region S covering the outer side region 43B of the airbag rear face 43. The plural inner side slits 54 and the plural outer side slits 56 are formed in the slit formation region S. The slit formation region S is thereby capable of movement in the vehicle width direction with respect to the airbag rear face 43.

Figure 4A:
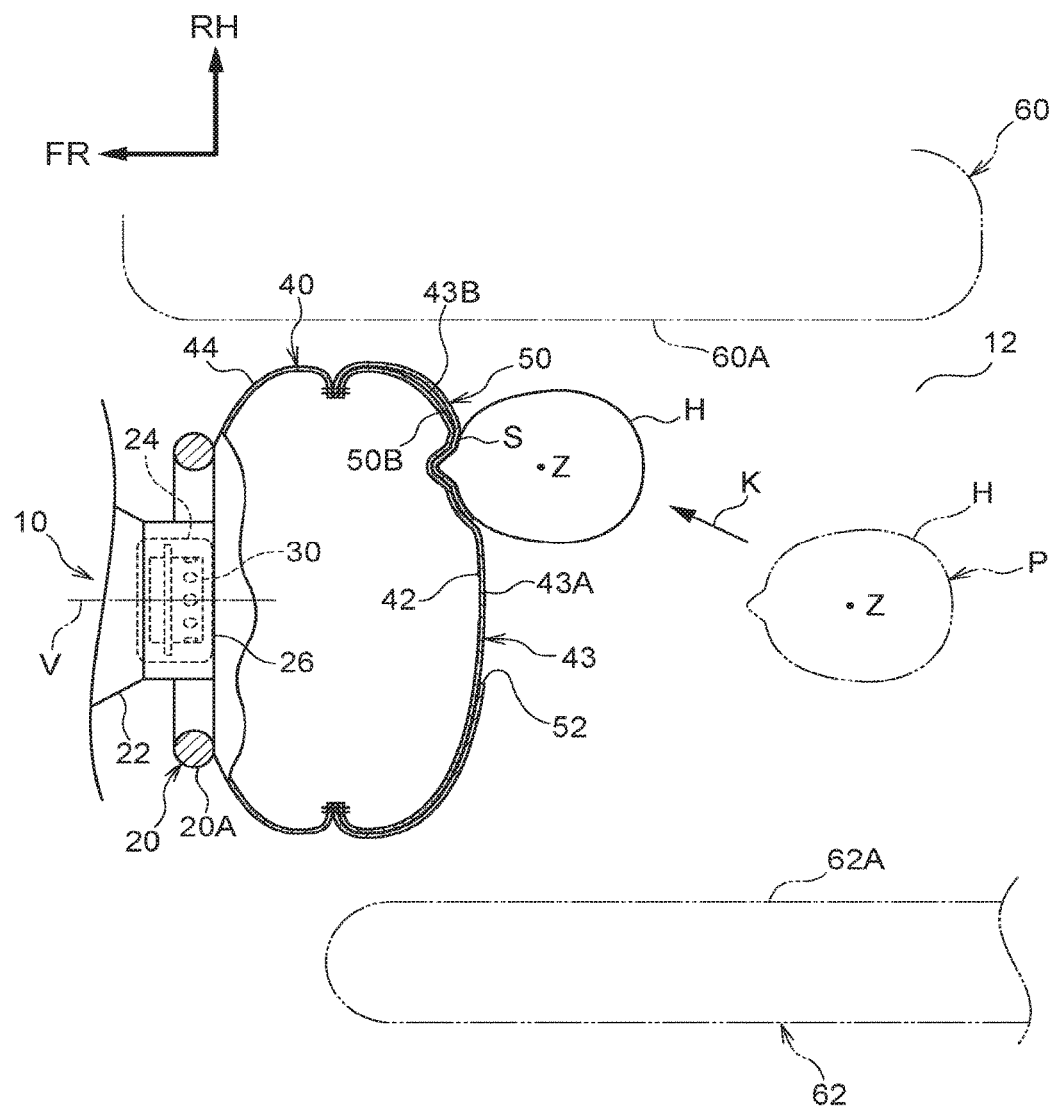
FIG. 4A is a plan view cross-section illustrating a state in which the head of an occupant has contacted the sliding cloth illustrated in FIG. 1.

Thus, as illustrated in FIG. 4A, when the occupant head H moves obliquely toward the vehicle front (the arrow K direction) at the time of an oblique collision, the occupant head H contacts the slit formation region S of the sliding cloth 50 at the outer periphery of the opening 52 obliquely toward the vehicle front. Thus, as illustrated in FIG. 4B, the slit formation region S moves toward the one vehicle width direction side (the outer peripheral side of the airbag rear face 43) with respect to the airbag rear face 43. The occupant head H moves (slides) together with the slit formation region S over the airbag rear face 43 toward the one vehicle width direction side as a result. The friction force F1 previously described (see FIG. 3) is thereby suppressed from occurring, and so rotation of the occupant head H about the up-down axis Z is suppressed.

In an oblique collision, the occupant head H is also more liable to contact a region of the driving seat airbag 40 that is peripheral to the rim 20A, as viewed from the axial direction of the steering wheel 20. However, as previously described, the sliding cloth 50 of the present exemplary embodiment covers the airbag rear face 43 from the inner side across to the outer side of the rim 20A, as viewed from the axial direction of the steering wheel 20. Thus, the occupant head H contacts the sliding cloth 50 more readily in cases in which the occupant head H has moved obliquely toward the vehicle front at the time of an oblique collision or the like. This enables rotation of the occupant head H at the time of an oblique collision or the like to be even more efficiently suppressed.

Supplemental Explanation of Slit Formation Region

Supplemental explanation follows regarding the range of the slit formation region S. As illustrated in FIG. 4A, when the airbag ECU 32 (see FIG. 1) of the present exemplary embodiment detects an oblique collision or the like, the airbag ECU 32 inflates and deploys a center airbag 60 of a center airbag device, not illustrated in the drawings, and a curtain airbag 62 of a curtain airbag device, not illustrated in the drawings. The center airbag 60 is inflated and deployed along the vehicle front-rear direction at the vehicle width direction center side of the driving seat airbag 40. The curtain airbag 62 is inflated and deployed in the vehicle front-rear direction along a front side door, not illustrated in the drawings, at the vehicle width direction outer side of the driving seat airbag 40.

Figure 4C:
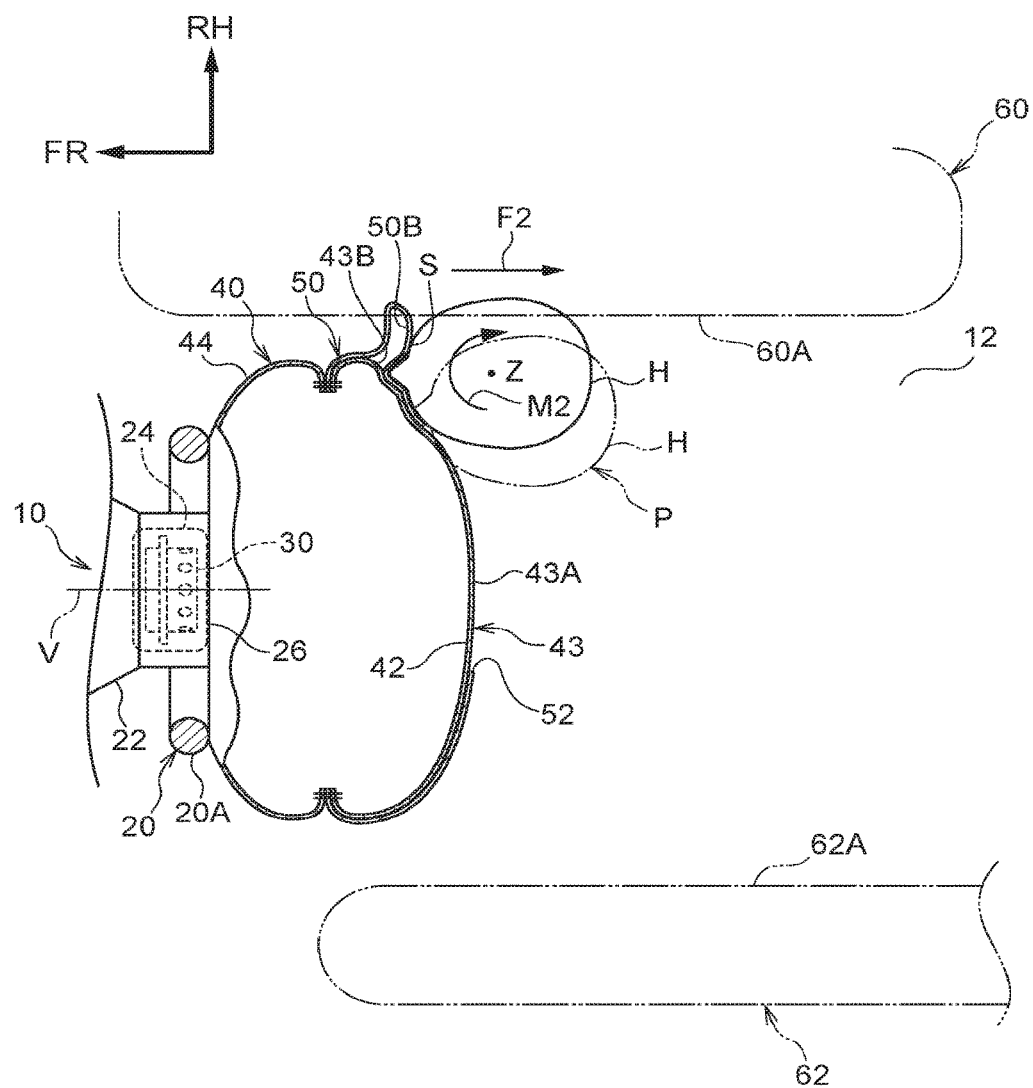
FIG. 4C is a plan view cross-section illustrating a state in which the sliding cloth illustrated in FIG. 4B has moved further toward the one vehicle width direction side with respect to the airbag rear face, and the occupant head has contacted a center airbag.

Note that, as illustrated in FIG. 4C, the occupant head H that has moved obliquely toward the vehicle front at the time of an oblique collision contacts the sliding cloth 50 of the driving seat airbag 40, and then contacts a side face 60A at the driving seat side of the center airbag 60. A friction force F2 toward the vehicle rear along the side face 60A thereby occurs at a contact portion of the occupant head H with the side face 60A of the center airbag 60. A moment M2, which rotates the occupant head H about the up-down axis Z such that that occupant head turns toward the center airbag 60 side, occurs due to the friction force F2. Namely, the moment M2 occurs in the occupant head H in a direction that cancels out the moment M1 (see FIG. 3) occurring at the time of contact with the airbag rear face 43 of the driving seat airbag 40. Rotation of the occupant head H about the up-down axis Z is thereby suppressed.

Thus, in vehicles installed with a center airbag device, rotation of the occupant head H can be more efficiently suppressed by providing the slit formation region S in a region of the driving seat airbag 40 from where the occupant head H contacts the driving seat airbag 40 to where the occupant head H contacts the side face 60A of the center airbag 60.

Note that, although not illustrated in the drawings, even in cases in which the occupant head H has moved toward the curtain airbag 62 side and contacted a side face 62A at the vehicle width direction inner side of the curtain airbag 62 at the time of a vehicle oblique collision, a moment occurs in the occupant head H in a direction that cancels out the moment M1 (see FIG. 1) occurring at the time of contact with the airbag rear face 43. Thus, in vehicles installed with a curtain airbag device, rotation of the occupant head H can be more efficiently suppressed by providing the slit formation region S in a region of the driving seat airbag 40 from where the occupant head H contacts the driving seat airbag 40 to where the occupant head H contacts the side face 62A of the curtain airbag 62.

In the above exemplary embodiment, there is no limitation to an oblique collision, and similar operation and advantageous effects to those described above can be obtained in cases in which the occupant head H contacts the sliding cloth 50 obliquely toward the vehicle front in a small overlap collision. In the above exemplary embodiment, there is no limitation to a collision at the front passenger seat side, and rotation of the occupant head H can be suppressed similarly to as described above, even in cases in which the occupant head H has moved obliquely toward the vehicle front (toward the vehicle front and the vehicle width direction outer side) at the time of an oblique collision or a small overlap collision at the driving seat side. This similarly applies to second and third exemplary embodiments, described later.

Full Overlap Collision

Explanation follows regarding operation of the driving seat airbag device 10 during a full overlap collision at the vehicle front face. As illustrated in FIG. 5, the occupant head H moves toward the vehicle front (the arrow L direction) during a full overlap collision. Note that the opening 52 is formed in the central section of the sliding cloth 50, and the central region 43A of the airbag rear face 43 is exposed by the opening 52.

Thus, when the occupant head H moves toward the vehicle front at the time of a full overlap collision, the occupant head H contacts the central region 43A of the airbag rear face 43 that is exposed through the opening 52 of the sliding cloth 50. Namely, in cases in which the occupant head H has moved toward the vehicle front at the time of a full overlap collision, the occupant head H is restrained by the central region 43A of the airbag rear face 43 without contacting the sliding cloth 50. This enables the occupant head H to be restrained by the airbag rear face 43 without being influenced by the sliding cloth 50 during a full overlap collision.

As previously described, in cases in which the occupant head H has moved obliquely toward the vehicle front at the time of an oblique collision, as illustrated in FIG. 4A, the occupant head H contacts the slit formation region S of the sliding cloth 50 obliquely toward the vehicle front. The occupant head H thereby slides together with the sliding cloth 50 toward the one vehicle width direction side of the airbag rear face 43. The occupant head H is thereby suppressed from rotating about the up-down axis Z.

Thus, the present exemplary embodiment enables rotation of the occupant head H at the time of an oblique collision to be suppressed, while eliminating, or alleviating, the influence of the sliding cloth 50 with respect to restraint performance of the occupant head H by the driving seat airbag 40 during a full overlap collision.

In the present exemplary embodiment, forming the opening 52 in the sliding cloth 50 reduces the volume of the sliding cloth 50 stowed in the airbag case 24 compared to cases in which the opening 52 is not formed in the sliding cloth 50. This enables the airbag case 24 to be made more compact.

Forming the sliding cloth 50 in a circular ring shape enables the occupant head H that has moved obliquely toward the vehicle front to be borne by the slit formation region S of the sliding cloth 50, regardless of a rotation angle of the steering wheel 20 during inflation and deployment of the driving seat airbag 40. Moreover, the plural inner side slits 54 and the plural outer side slits 56, which extend from the center side toward the outer peripheral side of the steering wheel 20 and are disposed along a circumferential direction of the steering wheel, are formed in the slit formation region S. This enables the inner side slits 54 and the outer side slits 56 to be disposed extending from the center side toward the outer peripheral side of the steering wheel 20 at both vehicle width direction sides of the driving seat airbag 40, regardless of the rotation angle of the steering wheel 20 during inflation and deployment of the driving seat airbag 40. This enables rotation of the occupant head H about the up-down axis Z to be effectively suppressed.

Second Exemplary Embodiment

Explanation follows regarding the second exemplary embodiment. Note that in the second exemplary embodiment, members with the same configuration as those in the first exemplary embodiment are appended with the same reference numerals, and explanation thereof is omitted.

Figure 6:
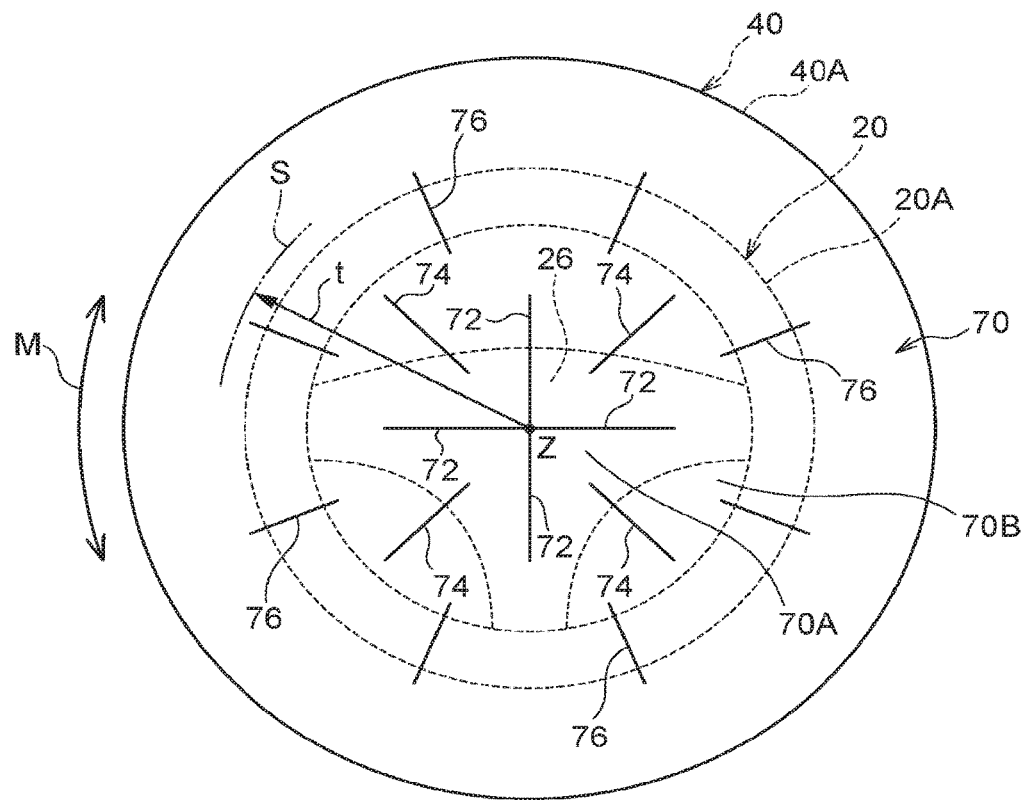
FIG. 6 is a face-on view corresponding to FIG. 2, illustrating a deployed state of a sliding cloth of a second exemplary embodiment.

FIG. 6 illustrates a sliding cloth 70 of the second exemplary embodiment in a deployed state. Plural central slits 72, serving as slits, are formed in a central region 70A of the sliding cloth 70, which is not formed with the opening 52 (see FIG. 2). Specifically, the central region 70A of the sliding cloth 70 covers the central region 43A of the airbag rear face 43 (see FIG. 7). Four of the central slits 72 are formed in a cross shape in the central region 70A of the sliding cloth 70 as viewed from the axial direction of the steering wheel 20. In other words, the plural central slits 72 extend from the center side toward the outer peripheral side of the steering wheel 20, and are disposed along a circumferential direction of the steering wheel 20.

Note that the plural central slits are not limited to a cross shape, and for example, plural (three or more, for example) central slits may be formed in a radiating shape from the center of the central region 70A of the sliding cloth 70 toward the radial direction outer side of the sliding cloth 70.

Plural intermediate slits 74 and plural outer side slits 76, serving as plural slits, are formed in a region from the central region 70A across to an outer side region 70B of the sliding cloth 70. The plural intermediate slits 74 extend from the center side toward the outer peripheral side of the steering wheel 20, and are disposed along a circumferential direction of the steering wheel 20. More specifically, the plural intermediate slits 74 extend along the radial direction of the steering wheel 20, and are disposed spaced at intervals along a circumferential direction of the steering wheel 20. The intermediate slits 74 are disposed offset in a circumferential direction of the steering wheel 20 from the plural central slits 72.

The plural outer side slits 76 extend from the center side toward the outer peripheral side of the steering wheel 20, and are disposed along a circumferential direction of the steering wheel 20. More specifically, the plural outer side slits 76 extend along the radial direction of the steering wheel 20, and are disposed at intervals along a circumferential direction of the steering wheel 20. The outer side slits 76 are disposed offset in a circumferential direction of the steering wheel 20 from the plural intermediate slits 74. The plural outer side slits 76 intersect the rim 20A as viewed from the axial direction of the steering wheel 20.

A slit formation region S of the sliding cloth 70, formed with the plural central slits 72, the plural intermediate slits 74, and the plural outer side slits 76 in this manner, enables the sliding cloth 70 to move in the vehicle width direction with respect to the airbag rear face 43. Note that the slit formation region S of the present exemplary embodiment is a circular shaped region of the sliding cloth 70 of radius t.

Explanation follows regarding operation of the second exemplary embodiment. Note that explanation mainly follows regarding operation of the second exemplary embodiment that differs from operation of the first exemplary embodiment.

Small Overlap Collision toward Front Passenger Seat Side

Figure 7:
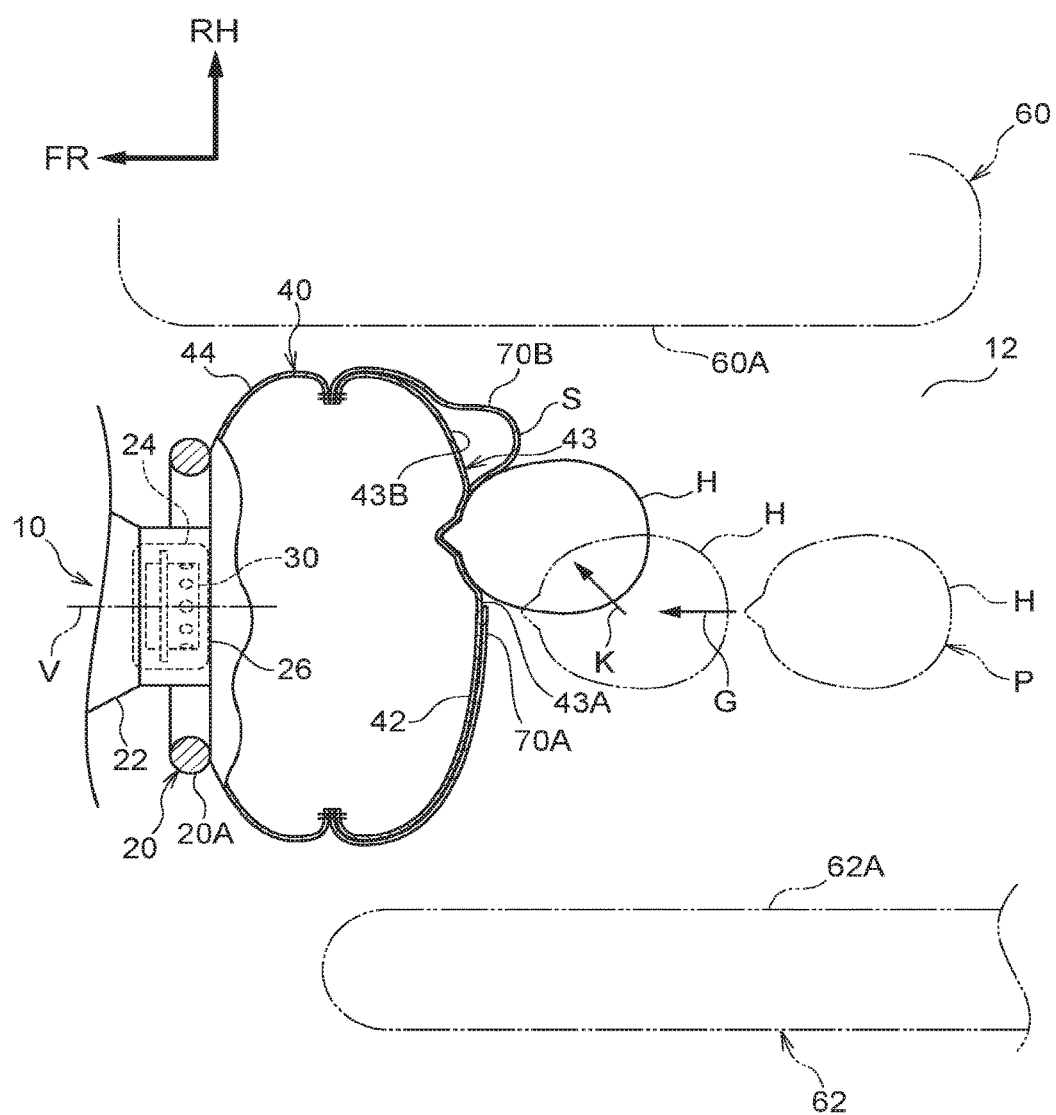
FIG. 7 is a plan view cross-section illustrating a state in which the head of an occupant has contacted a central region of the sliding cloth illustrated in FIG. 6.

As illustrated in FIG. 7, during a small overlap collision at the front passenger seat side, for example, the occupant head H of the driving seat occupant P moves toward the vehicle front (the arrow G direction), and then moves obliquely toward the vehicle front (the arrow K direction) prior to contacting the central region 70A of the sliding cloth 70. Alternatively, although not illustrated in the drawings, the occupant head H moves toward the vehicle front (the arrow G direction), and then moves obliquely toward the vehicle front (the arrow K direction) after having contacted the central region 70A of the sliding cloth 70.

Note that, as illustrated in FIG. 6, the plural central slits 72 are formed in the central region 70A of the sliding cloth 70. The plural intermediate slits 74 are formed in the sliding cloth 70 at the outer peripheral side of the central slits 72. The plural outer side slits 76 are formed in the sliding cloth 70 at the outer peripheral side of the plural intermediate slits 74. The slit formation region S of the sliding cloth 70, formed with the plural central slits 72, the plural intermediate slits 74, and the plural outer side slits 76, is capable of movement in the vehicle width direction with respect to the airbag rear face 43.

Thus, when the occupant head H moves obliquely toward the vehicle front (the arrow K direction) of the vehicle after having neared the central region 70A of the sliding cloth 70 at the time of a small overlap collision, as illustrated in FIG. 7, the occupant head H contacts the central region 70A of the sliding cloth 70 obliquely toward the vehicle front. The slit formation region S in the central region 70A of the sliding cloth 70 thereby moves toward the one vehicle width direction side (the outer peripheral side of the airbag rear face 43) with respect to the airbag rear face 43. The occupant head H slides together with the slit formation region S over the airbag rear face 43 toward the one vehicle width direction side as a result. The friction force F1 previously described (see FIG. 3) is accordingly suppressed from occurring, and rotation of the occupant head H about the up-down axis Z is suppressed.

Oblique Collision

Although not illustrated in the drawings, similarly to in the first exemplary embodiment, in cases in which the occupant head H has contacted the outer side region 70B at the outer peripheral side of the central region 70A of the sliding cloth 70 obliquely toward the vehicle front at the time of an oblique collision, the slit formation region S in the outer side region 70B is moved toward the one vehicle width direction side with respect to the airbag rear face 43. Thus, rotation of the occupant head H about the up-down axis Z at the time of an oblique collision is suppressed, similarly to in the first exemplary embodiment.

In this manner, the present exemplary embodiment enables rotation of the occupant head H about the up-down axis Z in a small overlap collision and an oblique collision to be efficiently suppressed. Note that there is no limitation to a collision at the front passenger seat side, and rotation of the occupant head H about the up-down axis Z during a small overlap collision or an oblique collision at the driving seat side can be suppressed similarly to as described above.

Full Overlap Collision

In cases in which the occupant head H has moved toward the vehicle front and has contacted the central region 70A of the sliding cloth 70 at the time of a full overlap collision, the occupant head H is restrained by the airbag rear face 43 in a state in which the occupant head H presses toward the vehicle front against the airbag rear face 43 with the sliding cloth 70 interposed therebetween. Thus, restraint performance of the occupant head H is also secured during a full overlap collision.

Note that in the present exemplary embodiment, there is a possibility that the slit formation region S of the sliding cloth 70 moves toward the vehicle upper side with respect to the central region 43A of the airbag rear face 43 during a full overlap collision. In contrast thereto, in the first exemplary embodiment, during a full overlap collision the occupant head H contacts the central region 43A of the airbag rear face 43, which is exposed through the opening 52 formed in the sliding cloth 50. Thus, in the first exemplary embodiment, as previously described, the influence of the sliding cloth 50 with respect to restraint performance of the occupant head H by the driving seat airbag 40 during a full overlap collision can be eliminated, or this influence can be alleviated.

Third Exemplary Embodiment

Explanation follows regarding the third exemplary embodiment. Note that in the third exemplary embodiment, members with the same configuration as those in the first and second exemplary embodiments are appended with the same reference numerals, and explanation thereof is omitted.

FIG. 8 illustrates a deployed state of a sliding cloth 80 of the third exemplary embodiment. The sliding cloth 80 is formed of a cloth that has a higher elongation ratio than the occupant-side base cloth 42 forming the airbag rear face 43. The sliding cloth 80 is thereby capable of movement in the vehicle width direction with respect to the airbag rear face 43. An opening 52 that exposes the central region 43A of the airbag rear face 43 is formed in a central region of the sliding cloth 80. The outer side region 43B of the airbag rear face 43 is covered by the sliding cloth 80.

Note that the elongation ratio of cloth is an index indicating the amount that a cloth has stretched at break when tensile force has been applied to tear the cloth, compared to the cloth before the tensile force was applied.

Explanation follows regarding operation of the third exemplary embodiment. Note that explanation mainly follows regarding operation of the third exemplary embodiment that differs from operation of the first and second exemplary embodiments.

Oblique Collision

Although not illustrated in the drawings, when the occupant head H moves obliquely toward the vehicle front at the time of an oblique collision, the occupant head H contacts the sliding cloth 80 covering the outer side region 43B of the airbag rear face 43 obliquely toward the vehicle front. The sliding cloth 80 is thereby stretched toward the one vehicle width direction side according to its elongation ratio, and moves toward the one vehicle width direction side (the outer peripheral side of the airbag rear face 43) with respect to the airbag rear face 43. The occupant head H slides together with the sliding cloth 80 over the airbag rear face 43 toward the one vehicle width direction side as a result. Rotation of the occupant head H about the up-down axis Z is thereby suppressed as a result, similarly to in the first exemplary embodiment.

There is no need to form slits in the sliding cloth 80 of the present exemplary embodiment, thereby enabling the manufacturing costs of the sliding cloth 80 to be reduced. The movement amount in the vehicle width direction of the sliding cloth 80 with respect to the airbag rear face 43 can be easily changed by selecting a cloth for forming the sliding cloth 80 from out of plural cloths with different elongation ratios as appropriate.

Note that in the present exemplary embodiment, the opening 52 is formed in the sliding cloth 80; however, the opening 52 may be omitted as appropriate. In such cases, rotation of the occupant head H about the up-down axis Z at the time of a small overlap collision can be efficiently suppressed, similarly to in the second exemplary embodiment. In the present exemplary embodiment, an outer peripheral section of the sliding cloth 80 is stitched to the outer peripheral section 40A of the driving seat airbag 40 similarly to in the first exemplary embodiment; however, the present exemplary embodiment is not limited thereto. For example, the entire driving seat airbag 40 excluding the gas supply section may be covered so as to be enveloped by a sliding cloth with a high elongation ratio formed in a bag shape.

Explanation follows regarding modified examples of the first to third exemplary embodiments. Note that explanation follows regarding various modified examples using the first exemplary embodiment as an example; however, these modified examples may also be applied as appropriate to the second and third exemplary embodiments.

In the first exemplary embodiment, the sliding cloth 50 is formed of the same type of cloth as that of the occupant-side base cloth 42; however, the first exemplary embodiment is not limited thereto. For example, the sliding cloth 50 may be formed using a cloth with a higher elongation ratio than that of the occupant-side base cloth 42, similarly to in the third exemplary embodiment. In such cases, the sliding cloth 50 moves even more readily in the vehicle width direction with respect to the airbag rear face 43.

Moreover, the sliding cloth 50 may be made to move more readily in the vehicle width direction with respect to the airbag rear face 43 by setting a coefficient of friction of a contact face 50B (see FIG. 1) of the sliding cloth 50 that contacts the airbag rear face 43 lower than a coefficient of friction of the airbag rear face 43.

Specifically, the sliding cloth 50 is formed using a low friction cloth material, for example. An example of such a low friction cloth material is a cloth material including fluorine fibers. Due to forming the sliding cloth 50 using such a low friction cloth material, the coefficient of friction of the contact face 50B (see FIG. 1) of the sliding cloth 50 that contacts the airbag rear face 43 is lower than the coefficient of friction of the airbag rear face 43. This enables the sliding cloth 50 to move more readily in the vehicle width direction with respect to the airbag rear face 43.

The sliding cloth 50 may be made to move more readily in the vehicle width direction with respect to the airbag rear face 43 by applying a low friction agent such as talcum powder (talc) to at least one of either the contact face 50B of the sliding cloth 50 or the airbag rear face 43.

The sliding cloth 50 may, for example, be formed of a coated cloth with a resin coating such as silicone applied to one face, or an uncoated cloth that does not have any resin coating applied to either face. Note that the one face of the coated cloth to which the resin coating is applied has a higher coefficient of friction than the other face of the coated cloth to which the resin coating has not been applied. Thus, the sliding cloth 50 may be made to move more readily in the vehicle width direction with respect to the airbag rear face 43 in cases in which the sliding cloth 50 is formed using a coated cloth by setting the other face of the sliding cloth 50 to which the resin coating has not been applied as the contact face 50B (see FIG. 1) that contacts the airbag rear face 43.

The sliding cloth 50 may also be made to move more readily in the vehicle width direction with respect to the airbag rear face 43 in cases in which the occupant-side base cloth 42 forming the airbag rear face 43 is formed using a coated cloth by forming the airbag rear face 43 using the other face to which the resin coating has not been applied.

In the first exemplary embodiment, the plural inner side slits 54 and the plural outer side slits 56 are formed in the sliding cloth 50; however, the number and placement of the slits formed in the sliding cloth 50 may be changed as appropriate. For example, the inner side slits 54 and the outer side slits 56 may extend in a direction that is sloped with respect to the radial direction of the steering wheel 20. The outer side slits 56 may be omitted as appropriate.

Note that the number and placement of the central slits 72, the intermediate slits 74, and the outer side slits 76 of the second exemplary embodiment with respect to the sliding cloth 70 may also be changed as appropriate. The intermediate slits 74 and the outer side slits 76 may also be omitted as appropriate.

In the first exemplary embodiment, the opening 52 formed in the sliding cloth 50 is formed in a circular shape; however, the shape of the opening 52 may be formed in an elliptical shape, a polygonal shape, or the like The first to third exemplary embodiments of the present disclosure have been explained above; however, the present disclosure is not limited to these first to third exemplary embodiments, and exemplary embodiments and various modified examples may be combined as appropriate. Obviously, various modifications may be implemented within a range not departing from the spirit of the present disclosure.

What is claimed is:

1. A driving seat airbag device, comprising:
   a driving seat airbag that is inflated and deployed at a vehicle rear side of a steering wheel on being supplied with gas; and
   a sliding cloth that is deployed in conjunction with inflation and deployment of the driving seat airbag, that covers an airbag rear face at a vehicle rear side of the driving seat airbag, and that is capable of movement in a vehicle width direction with respect to the airbag rear face,
   wherein a space between the sliding cloth and the airbag rear face of the driving seat airbag is free of a connection to an interior of the driving seat airbag,
   wherein the sliding cloth covers the airbag rear face of the driving seat airbag in an inflated and expanded state of the driving seat airbag, and
   wherein an opening that exposes a central region of the airbag rear face is formed in the sliding cloth.

2. The driving seat airbag device of claim 1, wherein:
   an outer peripheral section of the driving seat airbag is inflated and deployed further toward an outer side than a rim of the steering wheel as viewed from an axial direction of the steering wheel;
   an outer peripheral section of the sliding cloth is joined to the outer peripheral section of the driving seat airbag; and
   the opening is disposed at an inner side of the rim as viewed from the axial direction of the steering wheel.

3. The driving seat airbag device of claim 2, wherein the sliding cloth covers the deployed airbag rear face from the inner side across to the outer side of the rim as viewed from the axial direction of the steering wheel.

4. The driving seat airbag device of claim 1, wherein a plurality of slits are formed in the sliding cloth.

5. The driving seat airbag device of claim 4, wherein each of the plurality of slits extends from a center side toward an outer peripheral side of the steering wheel and are disposed along a circumferential direction of the steering wheel.

6. The driving seat airbag device of claim 4, wherein at least one slit of the plurality of slits configures an inner side slit extending out from a peripheral edge of the opening toward a radial direction outer side of the steering wheel.

7. The driving seat airbag device of claim 6, wherein one or more of the plurality of slits configures an outer side slit that is disposed further toward an outer peripheral side of the steering wheel than the inner side slit, and that extends in a radial direction of the steering wheel.

8. The driving seat airbag device of claim 7, wherein the inner side slit and the outer side slit are disposed offset from each other in a circumferential direction of the steering wheel.

9. The driving seat airbag device of claim 8, wherein:
   a plurality of the inner side slits are disposed along the circumferential direction of the steering wheel; and
   the one or more outer side slits extend out toward the radial direction outer side of the steering wheel from between adjacent slits of the inner side slits.

10. The driving seat airbag device of claim 1, wherein an elongation ratio of the sliding cloth is higher than an elongation ratio of an occupant-side base cloth that forms the airbag rear face.

11. A driving seat airbag device, comprising:
    a driving seat airbag that is inflated and deployed at a vehicle rear side of a steering wheel on being supplied with gas; and
    a sliding cloth that is deployed in conjunction with inflation and deployment of the driving seat airbag, that covers an airbag rear face at a vehicle rear side of the driving seat airbag, and that is capable of movement in a vehicle width direction with respect to the airbag rear face,
    wherein a space between the sliding cloth and the airbag rear face of the driving seat airbag is free of a connection to an interior of the driving seat airbag,
    wherein the sliding cloth covers the airbag rear face of the driving seat airbag in an inflated and expanded state of the driving seat airbag, and
    wherein a plurality of slits are formed in the sliding cloth.

12. The driving seat airbag device of claim 11, wherein the plurality of slits extend from a center side toward an outer peripheral side of the steering wheel and are disposed along a circumferential direction of the steering wheel.

13. The driving seat airbag device of claim 11, wherein a coefficient of friction of a contact face of the sliding cloth that contacts the airbag rear face is lower than a coefficient of friction of the airbag rear face.

14. A driving seat airbag device, comprising:
    a driving seat airbag that is inflated and deployed at a vehicle rear side of a steering wheel on being supplied with gas; and
    a sliding cloth that is deployed in conjunction with inflation and deployment of the driving seat airbag, that covers an airbag rear face at a vehicle rear side of the driving seat airbag, and that is capable of movement in a vehicle width direction with respect to the airbag rear face, wherein a space between the sliding cloth and the airbag rear face of the driving seat airbag is free of a connection to an interior of the driving seat airbag, wherein the sliding cloth covers the airbag rear face of the driving seat airbag in an inflated and expanded state of the driving seat airbag, wherein the driving seat airbag is inflated and deployed in a circular shape as viewed from an axial direction of the steering wheel, and wherein the sliding cloth is deployed in a circular ring shape as viewed from the axial direction of the steering wheel.

* * * * *